(12) United States Patent
Blasco Claret et al.

(10) Patent No.: US 8,385,434 B2
(45) Date of Patent: Feb. 26, 2013

(54) PROCESS OF SYNCHRONIZATION IN THE TIME AND FREQUENCY DOMAIN OF MULTIPLE EQUIPMENTS IN A TRANSMISSION SYSTEM WITH OFDM MODULATION

(75) Inventors: Jorge Vicente Blasco Claret, Valencia (ES); Juan Carlos Riveiro Insúa, Valencia (ES); Salvador Iranzo Molinero, Valencia (ES)

(73) Assignee: Marvell Hispania, S. L. U., Madrid (ES)

( * ) Notice: Subject to any disclaimer, the term of this patent is extended or adjusted under 35 U.S.C. 154(b) by 1180 days.

(21) Appl. No.: 11/155,316

(22) Filed: Jun. 17, 2005

(65) Prior Publication Data

US 2006/0140292 A1 Jun. 29, 2006

Related U.S. Application Data (63) Continuation of application No. PCT/ES2004/000003, filed on Jan. 8, 2004.

(30) Foreign Application Priority Data

Jan. 10, 2003 (ES) .................................. 200300052

(51) Int. Cl.
*H04K 1/10* (2006.01)

(52) U.S. Cl. ....................................... 375/260; 375/259

(58) Field of Classification Search .................. 375/260, 375/354, 355, 259; 370/206, 208, 69.1; 714/786, 714/794, 795; 455/59
See application file for complete search history.

(56) References Cited

U.S. PATENT DOCUMENTS

| | | | | |
|---|---|---|---|---|
| 5,345,440 A * | 9/1994 | Gledhill et al. | ............... | 370/210 |
| 5,732,113 A * | 3/1998 | Schmidl et al. | ............... | 375/355 |
| 6,038,275 A * | 3/2000 | Taura et al. | .................... | 375/371 |
| 6,058,101 A * | 5/2000 | Huang et al. | .................. | 370/208 |
| 6,091,932 A * | 7/2000 | Langlais | ....................... | 725/111 |
| 7,319,660 B2 * | 1/2008 | Kim et al. | ..................... | 370/208 |
| 7,580,347 B2 * | 8/2009 | Geile et al. | .................... | 370/208 |
| 2002/0042661 A1 * | 4/2002 | Kim | ................................. | 700/94 |
| 2002/0159534 A1 * | 10/2002 | Duncan et al. | ................ | 375/260 |
| 2004/0001563 A1 * | 1/2004 | Scarpa | ......................... | 375/326 |
| 2004/0029548 A1 * | 2/2004 | Li | ................................... | 455/307 |
| 2004/0081205 A1 * | 4/2004 | Coulson | ........................ | 370/503 |
| 2004/0258098 A1 * | 12/2004 | Ohkubo et al. | ................ | 370/503 |
| 2007/0019751 A1 * | 1/2007 | Fanson et al. | ................. | 375/260 |
| 2007/0025236 A1 * | 2/2007 | Ma et al. | ....................... | 370/208 |

FOREIGN PATENT DOCUMENTS

JP 2003115816 4/2003

* cited by examiner

*Primary Examiner* — Shuwang Liu
*Assistant Examiner* — Helene Tayong (57) ABSTRACT

A system for synchronization of an orthogonal frequency division multiplexing signal having a first frequency. The system includes filters configured to receive the OFDM signal, and output second signals corresponding to different frequency bands of the OFDM signal. Each of the second signals includes a corresponding synchronization symbol associated with the OFDM signal, and the synchronization symbols of each of the second signals are the same. The system further includes a Fourier transform circuit configured to receive the second signals from the filters, and output the second signals. Each of the second signals has a second frequency. The system is configured to detect the synchronization symbols in the second signals, and detect a start of OFDM symbols in the OFDM signal based on the detected synchronization symbols. The start of the OFDM symbols corresponds to an average of a plurality of estimations of the start of the OFDM symbols.

20 Claims, 5 Drawing Sheets

PROCESS OF SYNCHRONIZATION IN THE TIME AND FREQUENCY DOMAIN OF MULTIPLE EQUIPMENTS IN A TRANSMISSION SYSTEM WITH OFDM MODULATION

RELATED APPLICATIONS

The present application is a Continuation of co-pending PCT Application No. PCT/ES2004/000003 filed Jan. 8, 2004 which in turn, claims priority from Spanish Application Serial No. P200300052, filed on Jan. 10, 2003. Applicants claim the benefits of 35 U.S.C. §120 as to the PCT application and priority under 35 U.S.C. §119 as to said Spanish application, and the entire disclosures of both applications are incorporated herein by reference in their entireties.

OBJECT OF THE INVENTION

The present invention, as described herein refers to a process of synchronization in the time and frequency domain for multiple equipments in a transmission system using OFDM (orthogonal frequency division multiplexing) modulation. The objective of this process is to improve the estimation of the start of the OFDM symbols and the estimation of frequency error in the oscillators in various situations such as in channels with narrow band noise, frequency selective channels or channels in which noise power varies with frequency. The application of this process to synchronisation also as well as facilitating simultaneous estimation of frequency error in the analog traslation and frequency error in the system sample allows said estimations to be carried out in situations where the classic synchronisation processes do not achieve results.

Furthermore, in cases where it is possible to carry out various estimations of these factors, the results, in the form of average or weighted average can be combined to achieve more accurate estimations with a smaller deviation from the real value that one wants to estimate.

BACKGROUND TO THE INVENTION

It is necessary to carry out a synchronisation process in the majority of telecommunication systems so as to adequately obtain the information transmitted from the received signals to the channel. One or more types of synchronization are required depending on how the transmission is carried out and the modulation used. In general, to transmit using OFDM modulation it is necessary to carry out synchronisation in time which consists of determining the start of the OFDM symbols in reception, and synchronization in frequency, so that frequency of the oscillators used for the sample or for the analog traslation of transmitted and received signal is sufficiently close.

Many methods of synchronisation of OFDM signals are known in the state of the art but none of these are secure enough to avoid false indications of synchronisation in point to multipoint systems in which the electricity network is the transmission means used.

It is well known that use of the electricity network as a transmission means is problematic for synchronisation since the connection-disconnection of various apparatus on the network produces tension peaks and impedance variation on the line causing channel response to vary in time. Impulsive noises, which are very usual in the electricity network affect synchronisation, in large part because by definition these are occasional noises that affect a small number of samples and therefore can impede adequate detection of the synchronisation sequences if they coincide in time with said sequences. Band separation as proposed in this patent, reduces the consequences of these noises so that it is possible to apply known synchronization methods, which due to the improvement proposed will offer optimum results in noisy environments such as the electricity network.

Among the synchronisation methods in the state of the art those that particularly stand out are described in U.S. Pat. No 5,732,113 which describes a process of time synchronisation that uses a single synchronisation symbol with two equal half symbols, and that described in Spanish patent submission 200.101.121 which refers to a "process for the synchronisation in the down stream of various uses in a point to multipoint transmission system with OFDM modulation", and which describes the transmission of two identical synchronisation symbols. The present invention improves synchronisation in the time and frequency domains due to synchronisation in various bands and achieves results with less variance and better adjusted to the real value than that which can be achieved by applying either of the previously mentioned process. Furthermore, the application of the method proposed allows synchronisation to be carried out in many cases where noise on the line and channel characteristics would prevent the achievement of any result when using known synchronisation methods.

On the other hand, it is important to indicate that the filter banks such as those described in the book "Multirate Systems and Filters Banks", by P. P. Vaidyanathan, published by Prentice Hall in 1993, are known but that these filters have not been used for the division of synchronisation sequences received for independent detection in frequency bands such as described in this invention and which achieves the considerable improvement over the state of the art as described above.

DESCRIPTION OF THE INVENTION

To achieve the objectives and avoid the inconveniencies described in previous paragraphs, this invention consists of a process for synchronisation in the time and frequency domain for multiple equipments in a transmission system with OFDM modulation.

This process is applicable to two-way communication applicable to two-way communication over the electricity network between different equipments connected to the same electricity network so as to provide an estimation of the start of the OFDM symbols in reception and the frequency error of the local oscillators in the equipments, and comprises the generation of synchronisation sequences that are transmitted over the electricity network. These synchronisation sequences are sent over the same channel used for the sending of data, said channel characterised by a connection between one equipment and all the other equipments. The process is characterized because it comprises the decomposition of the received signals made up of the synchronisation sequences and data in various frequency bands or ranges. Thereafter, the synchronisation sequences of each one of the frequency bands is detected by applying a synchronisation algorithm in time that allows the start of the OFDM symbol and frequency error in the local oscillators in each frequency band to be estimated, instead of the complete received signal which is the conventional method.

It is thanks to these characteristics that the process allows improvement in the estimation of the start of the OFDM symbols and in the estimation of frequency error in the oscillators in the equipments in cases where narrow band noises are present in the channel, that is, ingress noise. In case of transmission over a frequency selective channel it improves estimation of the start of the OFDM symbols and it improves frequency error in the case that the noise power added to the channel by the signal varies with frequency, that is, in case the channel includes coloured noise. Another of the advantages of this process is that it permits estimation of sample frequency error, that increases linearly with frequency and which cannot be estimated conventionally with the complete signal, and it improves estimation of frequency error in analog traslation with respect to the use of the complete received signal for the estimation of same. It also allows simultaneous estimation of frequency error in analog traslation and carries out the estimation of the start of the OFDM symbols as well as calculating frequency error in the sample when detected in two or more frequency bands or ranges including in cases where use of the complete signal does not produce a result. Finally, the process in this invention facilitates improving the results of the estimation of the start of the OFDM signal and the frequency error in case detection of the synchronisation sequence is achieved in more than one frequency band by means of combining the estimation obtained in each frequency and, by average or weighted average linear regression.

In the process in this invention break down of the received signal into frequency bands or ranges is carried out by applying a band pass filter centred in each one of the frequency bands, a frequency traslation in the filtered signals to work with each band in base band, and optionally, an decimator to simplify the complexity of the electronics necessary to detect the synchronisation sequence.

Another way of carrying out this break down is to filter the synchronisation sequences simultaneously by means of uniform and decimated DFT (Discreet Fourier Transform) filters with the complexity of a prototype band pass filter, and a Discreet Fourier Transform (DFT).

In the same way, the breakdown or the synchronisation sequences may also be carried out directly by means of a Discreet Fourier Transform (DFT) circuit.

In the process described in this invention, detection of the synchronisation sequences takes place in each one of the frequency bands or ranges by means of maximizing the maximum likelihood known conventionally so that estimation of the start of the OFDM symbols is carried out from the calculation of the maximum time correlation of the samples in each band, and this maximum becomes the mid point in the flat zone for the correlation peak, whose size in number of samples is equal to the number of samples of the cyclic prefix without inter-symbol interference (ISI), and thereafter the angle of this correlation in the moment determined as maximum correlation is calculated in each one of the frequency bands so as to achieve an estimate of frequency error and adjust the oscillators to a common reference.

The correlation maximum is calculated by detecting the correlation peaks that surpass a power threshold in each one of the frequency bands or ranges in the received signal, and because the value of this threshold is fixed to minimize the probability of producing false alarms, and the correlation is calculated by means of the following algorithm:

$$P_i(d) = \sum_{m=0}^{L-1} (r_{i,d-m} r_{i,d-m-L}^*)$$

and the power is calculated by means of the following algorithm:

$$R_i(d) = \frac{1}{2} \sum_{m=0}^{2L-1} |r_{i,d-m}|^2$$

where $r_{i,d}$ is the signal corresponding to the frequency corresponding to the i-esima in the moment d, L is the number of samples in the half symbol, Pi(d) is the correlation in the band i-esima in the moment d and Ri(d) power in the band i-esima in the moment d.

The calculation of correlation and power is undertaken iteratively, storing the samples and preferably the partial products to calculate the correlation and the power by means of the following algorithms:

$$P_i(d) = P_i(d-1) + r_{i,d} r_{i,d-L}^* - r_{i,d-L} r_{i,d-2L}^*$$

$$R_i(d) = R_i(d-1) + \frac{1}{2}|r_{i,d}|^2 - \frac{1}{2}|r_{i,d-2L}|^2$$

where $P_i$ (d) is the correlation in the frequency band i-esima in the moment d, $R_i$ (d) power in the i-esima band and in the moment d, and $r_{i,x}$ the signal corresponding to the i-esima band in the moment x.

The moment of detection of the synchronisation sequences is taken to be the mid point of the zone that exceeds 90% of the maximum correlation while delaying an adequate number of samples to reduce interference between symbols to a minimum, and the number of samples is adjustable.

On the other hand, because the real part of the correlation dominates the imaginary part it is possible to use only the real part of the correlation to simplify the calculation of the correlation in each frequency band or range if the frequency error is less than a certain threshold.

To improve the results of the estimation of the start of the OFDM symbols in each frequency band one can combine these results as averages or weighted averages so that the final estimate will be more reliable and with less variance than that obtained using the complete received signal without separation in ranges.

Separating frequency bands improves the calculation of the frequency error in analog traslation by reducing variance when the averages or weighted averages of the error values calculated in each of the frequency bands is used.

Furthermore, separating the frequency bands permits estimation of error in the sample frequency by means of linear regression of the values of the errors obtained in each band and said error value cannot be estimated conventionally using the full received signal since the error in sample frequency increases with frequency.

Finally, and thanks to the separation into bands, the error in analog frequency traslation and the error in sample frequency can be estimated simultaneously.

On the other hand, the process in this invention may also be used when coexistence symbols are transmitted, these are detected in reception by means of band separation and detected in each one of these bands, with the objective of allowing the system to recognize if another has transmitted a certain sequence in the channel or not.

The following drawings are provided to facilitate a better understanding of the present invention and while forming an integral part of the detailed description and the claims, they offer an illustrative but not limited representation of the principles of this invention.

DESCRIPTION OF AN EMBODIMENT OF THE INVENTION

This section provides a description of an example of one embodiment of the invention, referencing the numbering used in the drawings.

All communication systems or at least a part of the communication system such as the synchronization block, require a minimum signal to noise ratio (SNR) in order to be able to function, that is, it is necessary that the received signal has a certain value relative to the noise value on the line so that the system can carry out communication. Minimum SNR cannot reach all the bandwidth used by the system in communication systems with a frequency selective channel, or in systems where noise is dependent on frequency, or in both, due to existing channel attenuation or to the noise level, however it can reach some frequency ranges within the total band width. The process described in this invention takes advantage of this circumstance to calculate estimates and synchronisation in such scenarios.

Figure 1:
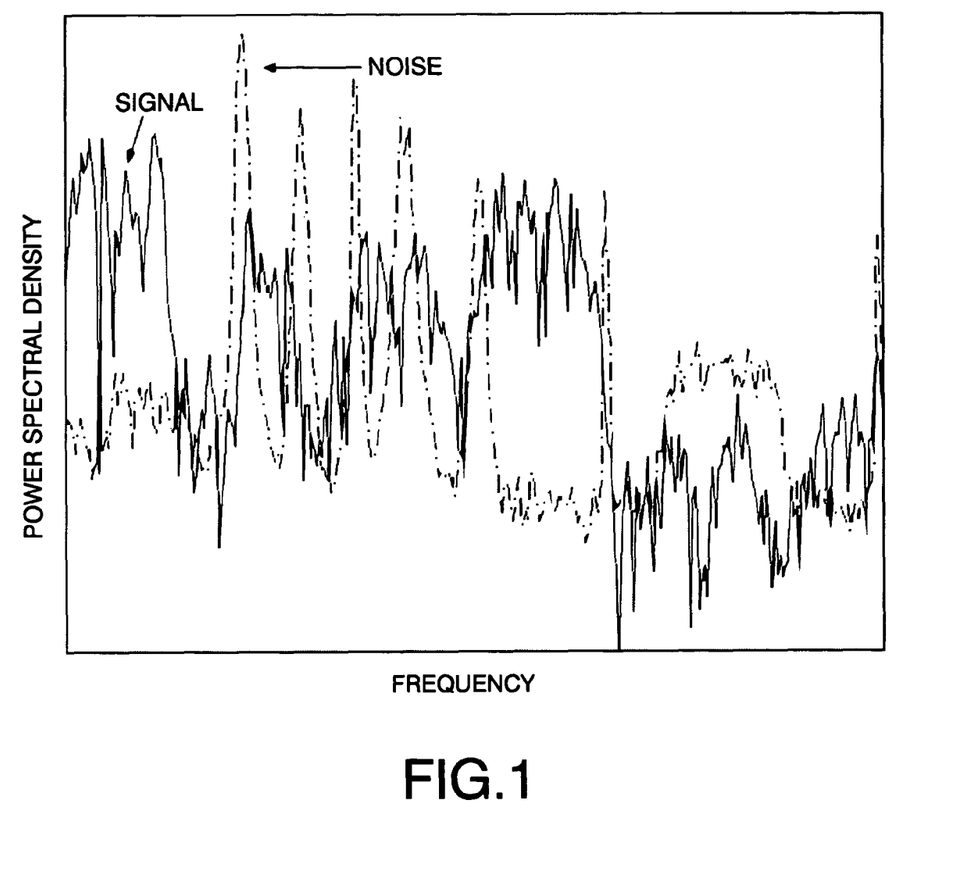
FIG. 1.—Represents an example spectral density of signal power and noise in reception in a specific scenario.
Figure 5:
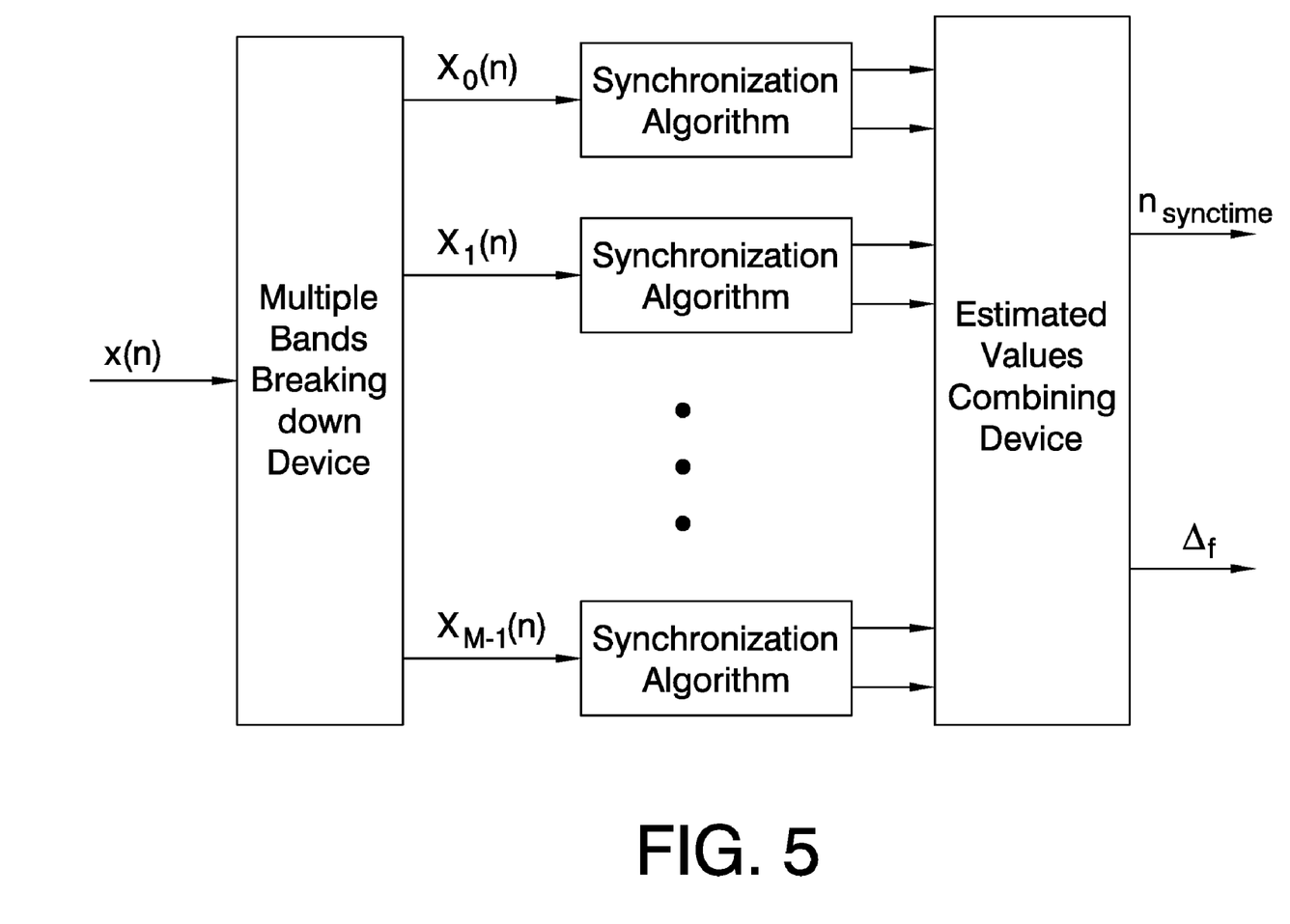
FIG. 5 is a block diagram illustrating the process of synchronization in the time and frequency domain with OFDM modulation.

FIG. 1 shows spectral density of signal power and noise at the receptor entrance in a certain situation. In this case, average SNR over the total band is 0dB, which is not enough for communication, but it can be seen that in certain frequency ranges the power density of the signal is higher than the noise and therefore in these ranges communication will be possible. Due to the behaviour of the channel in such situations classic processes either cannot achieve synchronization, or they only achieve it with very poor quality. This type of channel is very common in systems that use the electricity network as the transmission medium. As can be seen in FIG. 5, the process described in this invention undertakes division into various frequency ranges (by means of filtering in reception) and works on each one these signal separately. In the majority of situations, synchronization is necessary to transmit a specific signal in each one of the frequency bands, and being able to synchronize in any of the bands improves the results. It is not enough to transmit an OFDM signal due to a specific characteristic of this type of modulation whereby multiple carriers once separated can regroup in bands. To divide the signal into bands a band pass filter centered in each of the frequency bands can be applied. Furthermore, the signal must be demodulated to take it to base band and decimated because if this is not done the frequency in each band will be the same as that in the original signal and total complexity will be multiplied by the number of bands. All these operations can be carried out simultaneously and efficiently using uniform and decimated DTF (discreet Fourier transform) filter banks, which is a well known process in the state of the art. In this case, the filter banks are as complex as a prototype band pass filter (which as mentioned previously is located in each frequency band) and it is used with a DFT. This structure can be seen in FIG. 2 where the filters Ei(z) correspond to the poly phase decomposition of the prototype filter where i=0, 1 ... M-1 where M is the number of bands in which the received signal x(n) is decomposed, 1 is a sample delay of($z^{-1}$) and 2 is a decimator for M. Decomposition of the entry signal in M frequency bands occurs at the exit to the inverse Fourier transform (IDFT)3 and each of the frequency bands has a sample frequency M times less than that of the entry signal. M is also the number of points in the IDFT. From this point in the system each of the M signals is treated independently and the estimations are carried out for each one of these bands separately. The complexity is similar to that obtained on carrying the estimations for the original signal since we have M signals but the master frequency for each one has been divided by M. Furthermore, some of the bands (sub-bands) may be eliminated if they do not contain information and therefore the complexity is further reduced.

The specifications for the prototype filter depend on the particular application for which the process described in this invention will be used. Some examples of such applications include estimation of signal parameters, the detection of coexistence signals or the detection of synchronism signals.

Another of these applications is synchronisation in OFDM systems. The majority of synchronisation methods for OFDM signals use the signal in time to carry out this function and therefore they fail in situations such as that presented in FIG. 1.

Figure 2:
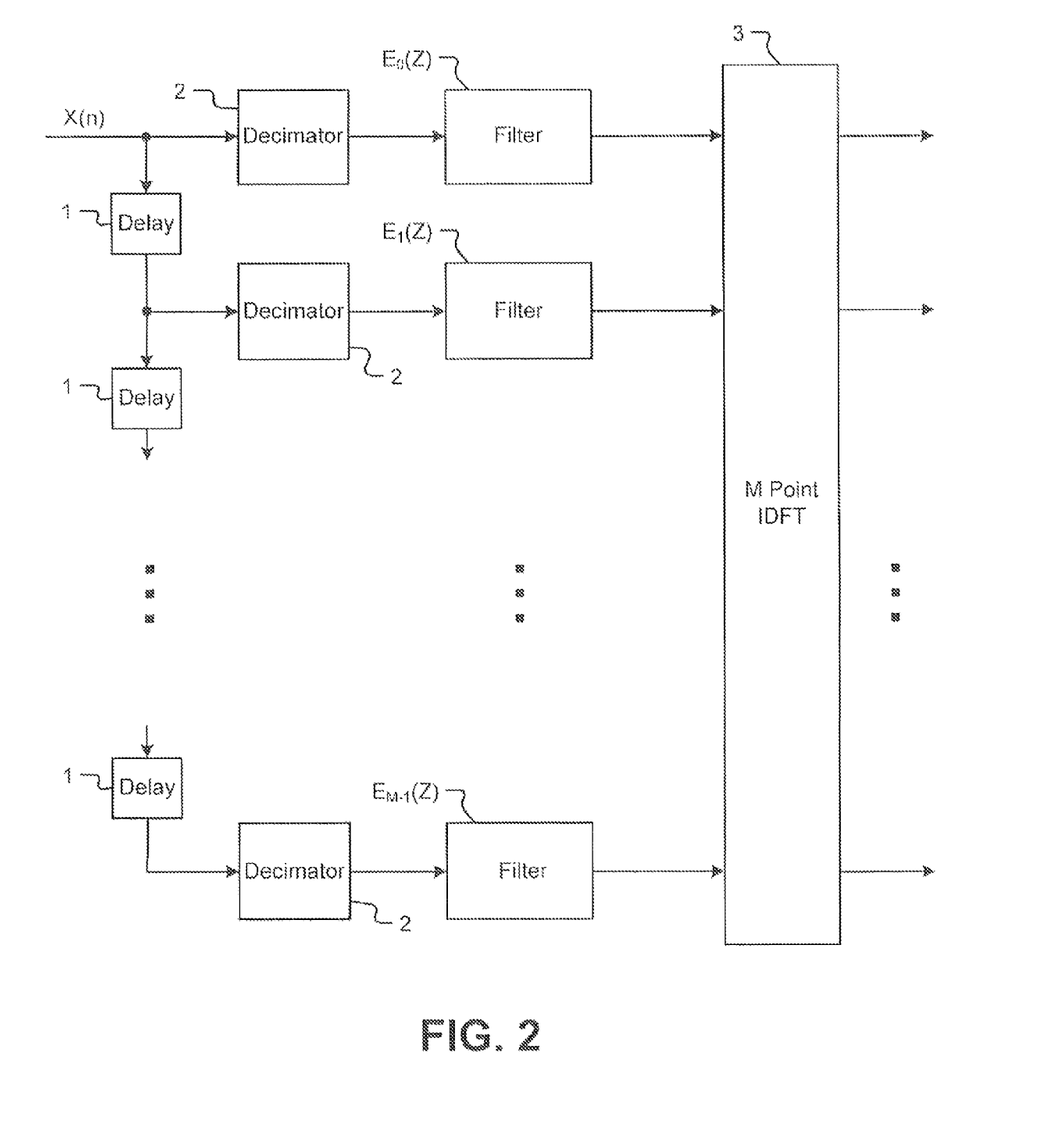
FIG. 2.—Graphically represents one of the means of carrying out division into frequency bands or ranges using uniform and decimated discreet Fourier transform (DFT) filters.
Figure 3:
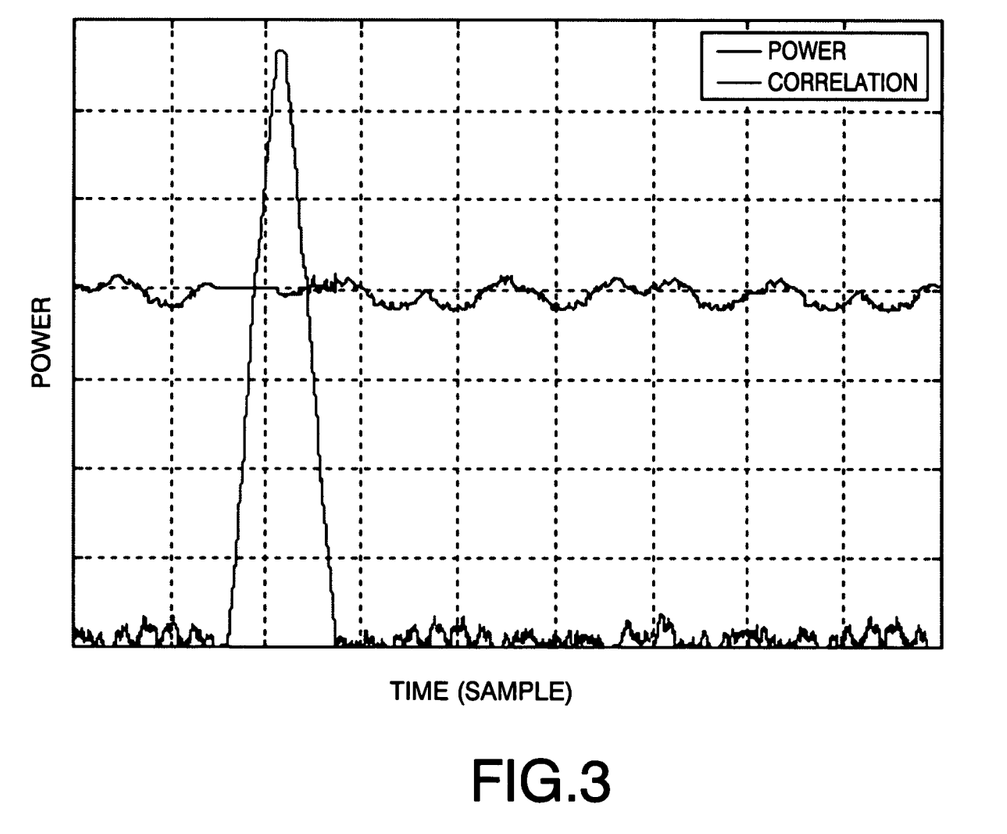
FIG. 3.—Graphically represents a typical correlation scenario and the power multiplied by a threshold starting from the samples obtained in reception.

It is principally in such cases that use of the structure presented in FIG. 2 can improve the synchronisation. In each of the frequency bands into which the signal is divided one may apply any of the methods described in the state of the art and correct synchronization in one band is sufficient to begin the demodulation process in reception, depending on the type of modulation used.

When SNR is high enough so that various band synchronise then we have various estimations of the start of the symbol and frequency error simultaneously and therefore techniques such as combining results to improve the final estimation can be applied.

The result is a method of synchronisation with diversity in frequency, highly resistant to narrow band noises, channel selectivity and power noise dependent on frequency and which can function in typical channels including in those with SNR less that −10 dB over the whole band. The only requirement needed is that SNR in one of the frequency bands or ranges are sufficient to detect the synchronisation signal used in this band.

For example, to obtain optimum results, this process can be applied along with the synchronisation method described in Spanish patent submission 200.101.121 concerning a "Process for downstream synchronisatioh of multiple users in a point to multipoint transmission system with OFDM modulation".

In this case, the signal to be transmitted is the same as in said patent, that is to say, two identical synchronisation symbols, due to the fact that this property is maintained when the signal is decomposed in the frequency bands. A structure such as that shown in FIG. 2 is placed in the receptor and thereafter the power and correlation metrics are calculated as in the patent mentioned above except that in this present case, the limits of all the sums are divided by M where M is the decimated value of the entry signal, or to put it another way, the number of bands.

Thanks to the separation of frequency into bands it is possible to carry out various estimations using only one synchronisation symbol and it is possible to achieve good synchronisation results even when using only one synchronisation symbol as a synchronisation sequence.

In this case, the synchronisation sequence is composed of only one synchronisation symbol divided into two equal halves. The information transmitted in the carriers used in the synchronisation symbols may be in fixed or psuedo-random sequence. The odd and even carriers in the OFDM symbols are set at zero so as to have the symmetry required in the synchronisation symbols.

The properties of the synchronisation symbol, and more specifically its symmetry, is maintained when the bands are separated in reception and this allows us to have multiple synchronisation results which facilitate improving their precision.

Any other type of synchronisation sequence (in relation to the number of symbols sent) and the method of detection may use the same method as described previously, only if the properties of the synchronisation symbol are maintained when band separation is carried out.

Therefore it is possible to use the following estimations in each one of the intervals as mentioned in US patent 5732113 "Timing and frequency synchronisation of OFDM signals" and combine these to obtain estimations with reduced variance using only one symbol as a synchronisation sequence:

$$P_i(d) = \sum_{m=0}^{L-1} (r_{i,d-m} r^*_{i,d-m-L})$$

$$R_i(d) = \frac{1}{2} \sum_{m=0}^{2L-1} |r_{i,d-m}|^2$$

Where $r_{i,d}$ is the exit in the i-esima branch of the filter band in the moment d, L is the number of samples in the half symbol divided by M, M is the number of bands that the signal is divided into, Pi(d) is the correlation of the i-esima branch in the moment d and Ri(d) power in i-esima branch in the moment d. In a similar way one can continue to apply the formulae iteratively.

$$P_i(d) = P_i(d-1) + r_{i,d} r^*_{i,d-L} - r_{i,d-L} r^*_{i,d-2L}$$

$$R_i(d) = R_i(d-1) + \frac{1}{2}|r_{i,d}|^2 - \frac{1}{2}|r_{i,d-2L}|^2$$

Once correlation and power have been calculated, synchronisation is detected as in the patent previously mentioned, the difference being that now we have various bands that are susceptible to synchronisation. FIG. 2 shows a typical case where synchronization is produced when the calculated power exceeds the correlation threshold. In the case where various bands synchronize the most appropriate estimator to use is the average of the estimations of the start of the symbol. It must be stated that each one of the estimations separately has a resolution M times less than the global estimate due to the decimator but variance in the final estimate is better than in previous methods when using the average.

In the same way, sample frequency error may be calculated from the correlation angle in the optimum moment in the window, substituting $f_i$ for central frequency in the band (subband).

$$\Delta f_s / f_s = - \frac{\angle P_i(d_{iopt})}{2\pi f_i K(N/2)}$$

Where <(.) is the angle parameter, $f_i$ central frequency in the i-esima band, K the interpolation order or decimator and N the number of samples in the OFDM symbol.

Depending on the type of error introduced by the system in this invention one estimates either, frequency error on traslation to the analog band, sample frequency error or both. The results obtained in each band are combined in one way or the other depending on the type of error that we need to estimate.

Figure 4:
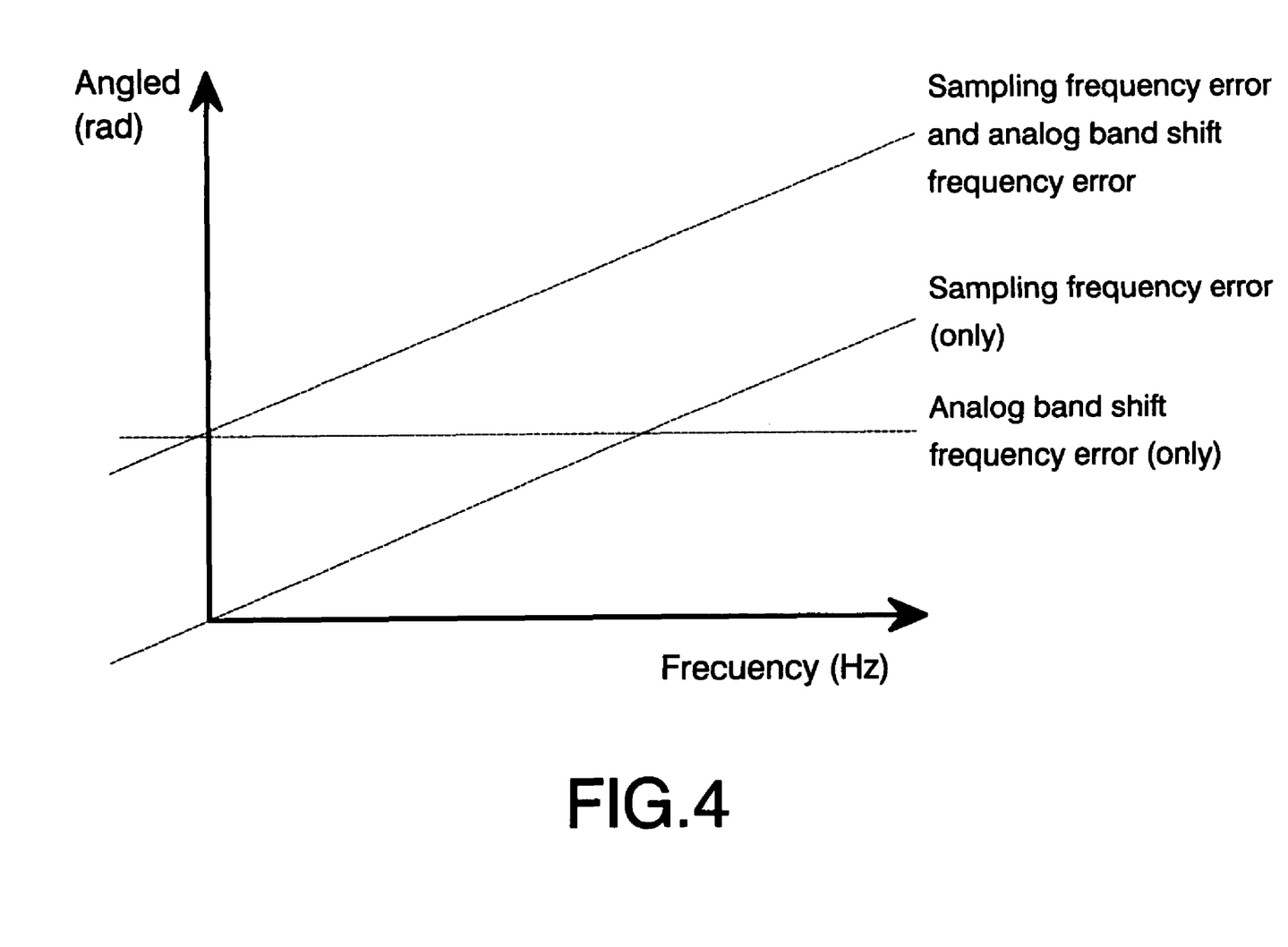
FIG. 4.—Demonstrates the comportment of the error in the sample frequency and the error in the analog translation frequency.

In case the system only has frequency error on traslation to the analog band, the average of the estimates in the different bands can be used as the estimation, as is shown in FIG. 4 (error type 1) since the error is the same in all bands. However, if what is needed is to calculate sample frequency error (error type 2), this process can not be immediately used since the value is not the same in all bands, rather, starting from the origin of the coordinates it increases with frequency as shown in FIG. 4. A linear regression of the co-relation angles in each one of the bands (by means of minimum squares or other known mathematical methods) is carried out to estimate the slope of this straight line and obtain a better estimation, and this can be carried out independently of the bands that are being synchronized. The estimation presented in the Spanish patent submission mentioned previously was reduced in selective frequency channels, due to the fact that it measured frequency error in the bands that suffered less attenuation. With this new method this reduction disappears since the error in each band is independently measured, thereby improving the estimation of the error. The following formulae may be used to estimate this error:

$$m = \sum_i \frac{f_i^* \angle P_I(D_{iopt})}{f_i^2}$$

$$\Delta f_s / f_s = \frac{-m}{2\pi KI(N/2)}$$

Where m is the result of linear regression of the estimates of the different band and $\Delta f_s/f_s$ sample frequency error.

Another advantage of the process in this invention is that it offers the possibility to simultaneously calculate error in sample frequency and error in traslation to the analog band (error type 3), by carrying out linear regression of the errors measured in each band to calcualte the slope (sample frequency error) and the cross over with the vertical axis (analog traslation frequency error) as can be seen in FIG. 4. Mathematically these values can be calcualted by:

$$m = \frac{n \sum_i |f_i^* \angle P_i(d_{iopt})| - \sum_i f_i^* \sum_i \angle P_i(d_{iopt})}{n \sum_i f_i^2 - \left[\sum_i f_i\right]^2}$$

$$b = \frac{\sum_i \angle P_i(d_{iopt}) - m \sum_i f_i}{n}$$

$$\Delta f_{IQ} = \frac{-b}{2\pi(T_s/2)}$$

Where n is the number of estimators used linear regression, $T_s$ is the time of the symbol with cyclical prefix and $\Delta f_{1_O}$ is the error in frequency traslation in the analog band. Sample frequency error is obtained from m as in the case where only sample frequency error occurs.

The process in this invention can also be used for coexistence signalling, that is the detection of signals used to implement a protocol for coexistence of various technologies over one transmission medium. In these protocols special signals that all systems must necessarily be capable of transmitting and receiving are used in order to implement an equitable medium access control, and must be detected even in conditions of very low SNR. In transmission media such as the electricity network or radio there is the added problem that these systems can transmit simultaneously if attenuation between them is sufficient to have the signals of one arrive at the other below the noise level, thereby making them undetectable to each other. Coexistence signals serve to determine if two or more nodes (equipment that may belong to one or more different communication systems) may transmit simultaneously, depending on whether the signal of one node is receive by the other with more or less power than noise for each one of the frequencies used in the communication.

Using current known methods it is very difficult to carry out this detection in scenarios such as that presented in FIG. 1 and therefore it is convenient to use the process described in the present invention. In this case, the best option is to transmit various signals in different frequencies (the number of frequencies depending on frequency selectivity in the channel), which are independently detected in reception. Detection of one of these frequencies is sufficient to determine that one node is transmitting the coexistence signal. To separate the different signals the structure shown in FIG. 2 is used in reception.

If the modulation used in one of the systems that must coexist is OFDM it is enough that some of the carriers have sufficient SNR for the demodulation of these carriers to be correct thanks to the good behaviour of this type of modulation in these type of frequency selective channels. It is also possible to carry out detection even when SNR is average or negative, if the correct value can be obtained in one of the ranges in which the received signal has been divided. If a coexistence signal that occupies full band width is used to implement coexistence it may give rise to the fact that this signal will not be detected by a node that uses OFDM modulation and two nodes may simultaneously occupy the channel causing interference, since the signal of one will not be lower than the noise level detected in reception in all frequencies in the second node. According to what is described herein, the process in this invention solves this problem.

The invention claimed is:

1. A system for synchronization of an orthogonal frequency division multiplexing (OFDM) signal having a first frequency, the system comprising:
   a plurality of filters configured to i) receive the OFDM signal, and ii) output a plurality of second signals, each of the plurality of second signals corresponding to a respective one of a plurality of different frequency bands of the OFDM signal, wherein each of the plurality of second signals includes a corresponding synchronization symbol associated with the OFDM signal, wherein the synchronization symbols of each of the plurality of second signals are the same; and
   a Fourier transform circuit configured to i) receive the plurality of second signals from each of the plurality of filters and ii) output a plurality of second signals, wherein each of the plurality of second signals output from the Fourier transform circuit has a second frequency that is less than the first frequency,
   wherein the system is configured to i) detect the synchronization symbols in the plurality of second signals having the second frequency and ii) detect a start of OFDM symbols in the OFDM signal based on the detected synchronization symbols, wherein the start of the OFDM symbols corresponds to an average of a plurality of estimations of the start of the OFDM symbols.

2. The system of claim 1, wherein detecting the synchronization symbols includes performing a linear regression of co-relation angles in each of the plurality of second signals corresponding to the plurality of different frequency bands.

3. The system of claim 1, further comprising:
   a plurality of decimators configured to i) receive the OFDM signal, ii) decimate the OFDM signal, and iii) provide the OFDM signal to the plurality of filters.

4. The system of claim 1, further comprising:
   a plurality of delay elements configured to i) delay the OFDM signal and ii) provide the OFDM signal to the plurality of filters.

5. The system of claim 1, wherein the plurality of filters are band pass filters.

6. The system of claim 1, wherein the OFDM signal is associated with two-way communication over an electricity network.

7. The system of claim 1, wherein the system is configured to detect a frequency error of at least one oscillator associated with the system based on the synchronization symbols.

8. The system of claim 1, wherein the system is configured to i) calculate a maximum time correlation of samples in each of the plurality of second signals based on a comparison of correlation peaks in the plurality of second signals to a power threshold.

9. The system of claim 8, wherein:
   a maximum correlation in each of the plurality of second signals is calculated according to $$P_i(d) = \sum_{m=0}^{L-1} (r_{i,d-m} r^*_{i,d-m-L})$$

and the power threshold is calculated according to $$R_i(d) = \frac{1}{2} \sum_{m=0}^{2L-1} |r_{i,d-m}|^2$$

where $r_{i,d}$ corresponds to a frequency of a band i-esima in a moment d, L is a number of samples in a half symbol, $P_i(d)$ is a correlation in the band i-esima in the moment d, and $R_i(d)$ is power in the band i-esima in the moment d.

10. The system of claim 9, wherein the maximum correlation and the power threshold are calculated further according to $$P_i(d) = P_i(d-1) + r_{i,d} r^*_{i,d-L} - r_{i,d-L} r^*_{i,d-2L}$$

$$R_i(d) = R_i(d-1) + \frac{1}{2}|r_{i,d}|^2 - \frac{1}{2}|r_{i,d-2L}|^2$$

where $P_i(d)$ is a correlation in the band i-esima in the moment d, $R_i(d)$ is power in the band i-esima in the moment d, and $r_{i,x}$ corresponds to the band i-esima in a moment x.

11. A method for synchronization of an orthogonal frequency division multiplexing (OFDM) signal having a first frequency, the method comprising:

filtering the OFDM signal to output a plurality of second signals, each of the plurality of second signals corresponding to a respective one of a plurality of different frequency bands of the OFDM signal, each of the plurality of second signals having a second frequency that is less than the first frequency, wherein each of the plurality of second signals includes a corresponding synchronization symbol associated with the OFDM signal, wherein the synchronization symbols of each of the plurality of second signals are the same;

performing a Fourier transform on the plurality of second signals;

detecting the synchronization symbols in the plurality of second signals;

detecting a start of OFDM symbols in the OFDM signal based on the detected synchronization symbols, wherein the start of the OFDM symbols corresponds to an average of a plurality of estimations of the start of the OFDM symbols.

12. The method of claim 11, wherein detecting the synchronization symbols includes performing a linear regression of co-relation angles in each of the plurality of second signals corresponding to the plurality of different frequency bands.

13. The method of claim 11, further comprising decimating the OFDM signal.

14. The method of claim 11, further comprising delaying the OFDM signal.

15. The method of claim 11, wherein the filtering includes filtering using a plurality of band pass filters.

16. The method of claim 11, wherein the OFDM signal is associated with two-way communication over an electricity network.

17. The method of claim 11, further comprising detecting a frequency error of at least one oscillator based on the synchronization symbols.

18. The method of claim 11, further comprising calculating a maximum time correlation of samples in each of the plurality of second signals based on a comparison of correlation peaks in the plurality of second signals to a power threshold.

19. The method of claim 18, further comprising:

calculating a maximum correlation in each of the plurality of second signals according to $$P_i(d) = \sum_{m=0}^{L-1} (r_{i,d-m} r^*_{i,d-m-L})$$

and calculating the power threshold according to $$R_i(d) = \frac{1}{2} \sum_{m=0}^{2L-1} |r_{i,d-m}|^2$$

where $r_{i,d}$ corresponds to a frequency of a band i-esima in a moment d, L is a number of samples in a half symbol, $P_i(d)$ is a correlation in the band i-esima in the moment d, and $R_i(d)$ is power in the band i-esima in the moment d.

20. The method of claim 19, further comprising calculating the maximum correlation and the power threshold further according to $$P_i(d) = P_i(d-1) + r_{i,d} r^*_{i,d-L} - r_{i,d-L} r^*_{i,d-2L}$$

$$R_i(d) = R_i(d-1) + \frac{1}{2}|r_{i,d}|^2 - \frac{1}{2}|r_{i,d-2L}|^2$$

where $P_i(d)$ is a correlation in the band i-esima in the moment d, $R_i(d)$ is power in the band i-esima in the moment d, and $r_{i,x}$ corresponds to the band i-esima in a moment x.

* * * * *

UNITED STATES PATENT AND TRADEMARK OFFICE
CERTIFICATE OF CORRECTION

PATENT NO. : 8,385,434 B2
APPLICATION NO. : 11/155316
DATED : February 26, 2013
INVENTOR(S) : Blasco Claret et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1463 days.

Signed and Sealed this
Second Day of December, 2014

Michelle K. Lee
*Deputy Director of the United States Patent and Trademark Office*